United States Patent Office 3,631,213
Patented Dec. 28, 1971

3,631,213
PROCESS FOR THE PREPARATION OF META- AND PARA-TERTIARYBUTYLSTYRENES
Charles C. Brewer, Baton Rouge, La., assignor to Foster Grant Co., Inc., Leominster, Mass.
No Drawing. Continuation-in-part of application Ser. No. 730,901, May 21, 1968. This application May 7, 1970, Ser. No. 35,595
Int. Cl. C07c 15/10
U.S. Cl. 260—669                                    10 Claims

ABSTRACT OF THE DISCLOSURE

This disclosure relates to a process for the production of tertiarybutylstyrenes by catalytic dehydrogenation of tertiarybutylethylbenzene.

---

This application is a continuation-in-part of U.S. patent application Ser. No. 730,901, filed May 21, 1968 now abandoned.

This invention relates generally to a process for the production of tertiarybutylstyrenes and more particularly to a process in which tertiarybutylethylbenzenes are dehydrogenated to produce meta- and para-tertiarybutylstyrenes by passing a mixture of the tertiarybutylethylbenzenes and steam over a dehydrogenation catalyst at an elevated temperature.

Meta- and para-tertiarybutylethylbenzenes have been prepared by the alkylation of ethylbenzene with isobutylene in an ice-cooled reactor by the use of liquid hydrofluoric acid as the alkylation catalyst. A mixture of meta- and para-tertiarybutylethylbenzenes was obtained. Para-tertiarybutylstyrene has been prepared from tertiarybutylacetophenone by reduction of the keto group with hydrogen and subsequent dehydration of the hydroxy compound.

Meta- and para-tertiarybutylethylbenzenes may also be prepared by the catalytic alkylation of ethylbenzene with isobutylene in the presence of catalyst such as concentrated sulfuric acid, borontrifluoride, aluminum trichloride, a combination of concentrated sulfuric acid and borontrifluoride, and a combination of hydrochloric acid and aluminum trichloride. In the preferred modification the catalyst is added to ethylbenzene and isobutylene is bubbled through the stirred ethylbenzene-catalyst mixture. The alkylation reaction is exothermic and the temperature of the reaction mixture rises slowly as isobutylene is added. The temperature of the reaction mixture is maintained above about 15° C., and below about 100° C. At a temperature below about 15° C., an undesirable amount of polymers is produced and at a temperature above about 100° C., high molecular weight compounds such as paraffins, as well as low molecular weight polymers of isobutylene, such as dimers and trimers of isobutylene, are produced. It is preferred that the reaction flask be flushed with nitrogen before isobutylene is added. The reaction may be conducted at atmospheric pressure or at a pressure above atmospheric pressure, the maximum pressure being not greater than about three atmospheres. At higher pressures and temperatures the yield of alkylation product is increased because the concentration of isobutylene in the ethylbenzene is higher. Isobutylene is added to the reaction mixture until it is no longer absorbed and the addition of isobutylene is then discontinued. The alkylation product is obtained by cooling the reaction mixture to room temperature and diluting with water. Water is slowly added with stirring to the reaction mixture or the reaction mixture may be slowly added with stirring to water in order to form an aqueous solution of the catalyst. The organic layer which contains unreacted ethylbenzene and meta- and para-tertiarybutylethylbenzenes, is removed, washed with water until the wash water is neutral, and dried over a suitable drying agent, such as calcium chloride. The dried organic layer is fractionally distilled, preferably under reduced pressure. The meta- and para-tertiarybutylethylbenzenes may be separated by fractional distillation in a very efficient column. Meta- and para-tertiarybutylethylbenzenes may be individually dehydrogenated or the mixture of meta- and para-tertiarybutylethylbenzenes which is obtained by the alkylation of ethylbenzene with isobutylene may be dehydrogenated.

The dehydrogenation of the meta- and para-tertiarybutylethylbenzenes is accomplished at an elevated temperature in the presence of steam and by the use of a dehydrogenation catalyst. The dehydrogenation may also be accomplished at an elevated temperature in the presence of steam and oxygen by the use of a dehydrogenation catalyst which contains as a promoter a platinum or palladium oxidation catalyst in elemental or chloride form. The dehydrogenation is conducted at a temperature within the range of from about 1000° F., to about 1300° F., preferably from about 1100° F. to about 1200° F. If the temperature is below about 1000° F., the percent of conversion to meta- and para-tertiarybutylstyrenes is not sufficiently high. If the temperature is above about 1200° F., the yield of meta- and para-tertiarybutylstyrenes is unsatisfactory because an undesirably large amount of the meta- and para-tertiarybutylethylbenzenes are pyrolyzed to produce low molecular weight compounds and carbon. The ratio of steam to meta- and para-tertiarybutylethylbenzenes is within the range of from about 1.5 to 20, preferably from about 3 to 7 pounds of steam to one pound of meta- and para-tertiarybutylethylbenzenes. If the ratio of steam to meta- and para-tertiarybutylbenzenes is less than above about 1.5 to 1, an undesirably high amount of the meta- and para-tertiarybutylethylbenzenes is pyrolyzed and a correspondingly large amount of carbon is deposited on the catalyst. Also, this amount of steam is insufficient to remove the carbon from the catalyst by the water-gas reaction as fast as it is deposited so that the catalyst gradually loses activity. If the ratio of steam to meta- and para-tertiarybutylethylbenzenes is greater than about 20 to 1, the process is uneconomical because the rate at which the meta- and para-tertiarybutylethylbenzenes pass through the reactor is so slow that the volume of the dehydrogenation product produced is undesirably low.

The steam-meta- and para-tertiarybutylethylbenzenes feed may be brought to the proper temperature for the dehydrogenation by mixing the meta- and para-tertiarybutylethylbenzenes with superheated steam which is at a temperature such that when mixing takes place the temperature of the feed is at the proper point, or, the feed may be brought to the proper temperature for the dehydrogenation by mixing meta- and para-tertiarybutylethylbenzenes in vapor form with steam which is at a temperature such that the temperature of the mixture is below the dehydrogenation temperature and subsequently heating this mixture by external means to bring it to the dehydrogenation temperature.

The meta- and para-tertiarybutylethylbenzenes-steam feed is passed through the catalyst at a space velocity of from about 0.1 to about 1.0, preferably from about 0.3 to about 0.5 pound of meta- and para-tertiarybutylethylbenzenes per hour per pound of catalyst. If the space velocity is less than about 0.1 pound of meta- and para-tertiarybutylethylbenzenes per hour per pound of catalyst, the residence time is so short that the degree of conversion is not high enough to make the process economically feasible. The meta- and para-tertiarybutylethylbenzenes-steam feed is introduced into the reactor at a pressure high enough to provide a space velocity within the above range.

If the dehydrogenation product is a mixture of metaand para-tertiarybutylstyrenes, the meta- and para-isomers may be separated by fractional distillation, preferably in the presence of a polymerization inhibitor, such as elemental sulfur, tertiary-butylcatechol, or nitrosophenylhydroxylamine, or combinations thereof.

Any catalyst which is suitable for use in producing olefins by dehydrogenation of the corresponding saturated compounds may also be used for the dehydrogenation of meta- and para-tertiarybutylethylbenzenes to produce meta- and para-tertiarybutylstyrenes. The catalyst used in this process is composed of at least one metal of groups IV to VIII of the Periodic Table, preferably in the form of an oxide thereof. The physical form of the catalyst may be any of the conventional particulate forms, such as pellets, pills, spheres, or irregular fragments. The catalyst is most effective in small particle sizes but the size should not be so small that passage through the catalyst of the mixture of steam and meta- and para-tertiarybutylethylbenzenes is impeded. A particularly favorable shape and size for catalyst particles is 1/8" to 3/16" pellets.

Particularly preferred are alkali promoted iron oxide catalysts described in United States Patent No. 2,990,432 which are produced by using as a binding agent a hydraulic cement, such as Portland cement, which is characterized by the presence of available calcium compounds. The use of the binding agent has the effect of lowering the surface area of the iron oxide from about 40 square meters to about 5 square meters. Other cements may be utilized which have available unbound calcium compounds. This catalyst consists essentially of iron oxide, a minor amount of an alkaline compound of an alkali metal, a minor amount of chromium oxide, and between about 5% and 30% by weight of a hydraulic cement containing free calcium oxide which is not chemically bound with aluminum or silica compounds. This catalyst has an internal surface area of less than 8 square meters per gram and is characterized by the presence of magnetite and calcium iron oxide upon X-ray diffraction analysis.

Other specific catalysts which are suitable for use in the dehydrogenation process are described in United States Patent No. 2,408,140. These catalysts comprise alkalized iron oxide in combination with chromium oxide. The concentration of chromium oxide is not considered to be extremely critical and catalysts consisting essentially of alkalized iron oxide and containing only one, three, and five mol percent of chromium oxide ($Cr_2O_3$) are particularly suitable. Also, catalysts which contain 30 mol percent, 50 mol percent and 70 mol percent of chromium oxide (the remainder being alkalized iron oxide, calculated as $Fe_2O_3$) are satisfactory. It is essential that the iron oxide be alkalized by the incorporation of a suitable alkali. Any of the oxides, hydroxides, and salts of the alkali or alkaline earth metals may be used. Particularly suitable alkalis are the hydroxides, nitrates, sulfates, and the carbonate of potassium. The concentration of alkali calculated as the oxide is at least 0.2 percent by weight of the catalyst and preferably between about 0.5 percent and 5 percent by weight of the catalyst. In general, catalysts of this type comprise a major mol amount of iron oxide, a minor mol amount of an alkaline compound of potassium and a minor mol amount of at least one mol percent of chromium oxide, the mixture having been calcined at a temperature between about 800° C. and about 950° C. in an atmosphere under which no appreciable formation of iron chromite takes place and for a sufficient length of time to decrease the available surface of the catalyst to below 30 square meters per gram.

Other suitable catalysts are those prepared according to United States Patent No. 2,426,829. These catalysts consist predominantly of iron oxide promoted with a minor amount of an alkali metal oxide, such as potassium oxide or sodium oxide.

Other suitable catalysts comprise dehydrogenation catalysts consisting essentially of from about 80 to 95 percent of iron oxide, from about one to four percent of an alkaline compound of potassium, and from about three to six percent of a chromium oxide, said percentages being on a weight basis, which are promoted with a minor conversion promoting amount of a platinum or palladium oxidation catalyst in the form of elemental platinum, elemental palladium, a platinum chloride, or a palladium chloride. In the use of a catalyst of this type, the dehydrogenation step is carried out in the presence of oxygen and steam. This catalyst may be prepared by ball-milling the separate components or by mixing the separate components with a small amount of water and forming the catalysts into pellets and drying the pellets. Also, the catalyst may be prepared by the coprecipitation of solutions of the reagents wherein the precipitate is convertible to the desired components of the catalyst or by impregnating iron oxide with the other components. A particularly suitable catalyst of this type contains at least 35% by weight of an iron oxide having a degree of oxidation from $Fe_3O_4$ to $Fe_2O_3$, calculated as $Fe_2O_3$, at least one percent of a compound of potassium which is at least partly convertible to potassium carbonate under the conditions of the dehydrogenation, and the remainder comprising an oxide of a heavy metal which is more difficultly reducible than an iron oxide, such as chromium, manganese, aluminum, or magnesium. The preferred catalyst of this type contains about 93 percent $Fe_2O_3$, five percent $Cr_2O_3$, and two percent $K_2O$, and also contains between about 0.01% to 2.5% of elemental platinum or palladium, based on the total weight of the catalyst, including any inert support.

The following examples illustrate how meta- and para-tertiarybutyl-ethylbenzenes may be prepared by the alkylation of ethylbenzene with isobutylene in the presence of alkylation catalysts of the Friedel-Crafts type.

EXAMPLE 1

A reaction flask equipped with a stirrer, thermometer, and inlet port, is partly immersed in a water bath. The flask is purged with nitrogen, 2½ liters of ethylbenzene are added to the flask, and the flask is again purged with nitrogen. The ethylbenzene, which is at at temperature of 21° C., is stirred and 50 grams of aluminum chloride are added. Isobutylene is bubbled through the stirred ethylbenzene-aluminum chloride mixture for three hours. The temperature of the reaction mixture rises slowly to 36° C. and remains at that temperature during the time isobutylene is passed through. After discontinuing the addition of isobutylene, the reaction mixture is cooled to room temperature and 250 ml. of water are slowly added with stirring. The organic layer is separated from the aqueous layer. The organic layer contains ethylbenzene, and meta- and paratertiarybutylethylbenzene.

EXAMPLE 2

A reaction flask equipped with a stirrer, thermometer, and inlet port is purged with nitrogen and 200 ml. of ethylbenzene are introduced into the flask. The flask is again purged with nitrogen and 50 ml. of concentrated sulfuric acid are slowly added with stirring. The reaction flask is surrounded by a waterbath. The temperature of the mixture of ethylbenzene and sulfuric acid is 15° C. at the time all the sulfuric acid is added. Isobutylene is bubbled into the stirred mixture until no more is absorbed. During this period the temperature rises to 60° C. The reaction mixture is cooled and water is slowly added with stirring and external cooling of reaction mixture. The organic and water layers are separated and the organic layer is washed with water, dried over calcium chloride and fractionally distilled.

The organic layer contains 67.2 percent of ethylbenzene, 2.4 percent of meta-tertiarybutylethylbenzene, and 25.8 percent of para-tertiarybutylethylbenzene.

EXAMPLE 3

The procedure of Example 2 is repeated except that two liters of ethylbenzene are used and the catalyst comprises 100 ml. of concentrated sulfuric acid and borontrifluoride. Borontrifluoride is bubbled through the solution until the solution is saturated. The temperature of the ethylbenzene before the addition of isobutylene is 15° C. Isobutylene and borontrifluoride are then passed simultaneously through the stirred solution until no more isobutylene is absorbed. The temperature at the end of the period of isobutylene addition is 98° C.

The separated, washed, and dried organic layer contains 35.5 percent of ethylbenzene, 4.9 percent of meta-tertiarybutylethylbenzene and 38.7 percent of para-tertiarybutylethylbenzene.

EXAMPLE 4

The procedure of Example 2 is repeated except that the volume of ethylbenzene is two liters. The catalyst is borontrifluoride and is added to the ethylbenzene by passing the gas into the stirred ethylbenzene for a period of five minutes after which time the solution is saturated and borontrifluoride is not absorbed. Isobutylene and borontrifluoride are then bubbled simultaneously through the stirred solution of borontrifluoride in ethylbenzene until isobutylene is no longer absorbed. The temperature during the time the isobutylene is bubbled into the reaction mixture is maintained at less than 50° C.

The separated, washed and dried organic layer contains 28.2 percent of ethylbenzene, 12.3 percent of meta-tertiarybutylethylbenzene, and 46.5 percent of para-tertiarybutylethylbenzene.

The following examples illustrate how the process of this invention may be carried out in practice, however, the invention is not to be restricted to the conditions and limitations of the examples.

EXAMPLE 5

A feed stock which contains 20.7 percent of meta-tertiarybutylethylbenzene and 70.6 percent of para-tertiarybutylethylbenzene is mixed with steam. The mixture is heated by external means to a temperature of 1150° F. The mixture is fed in at the top of a reactor which contains the dehydrogenation catalyst in granular form. The temperature at the top of the reactor is 1090° F.; the temperature in the middle of the reactor is 1085° F.; and the temperature at the bottom of the reactor is 1100° F. The pressure of the mixture of feed and steam at the inlet of the reactor is 24 pounds per square inch gauge. The ratio of steam to feed stock is 3 pounds of steam per pound of feed stock. The mixture of steam and feed stock is passed through the catalyst bed at a space velocity of 0.3 pound of feed stock per hour per pound of catalyst. The steam coming from the bottom of the reactor is cooled and the organic layer is separated from the aqueous layer.

The product contains 10.7 percent of meta-tertiarybutylstyrene, 38.0 percent of para-tertiarybutylstyrene, 9.0 percent of meta-tertiarybutylethylbenzene, and 29.4 percent of para-tertiarybutylethylbenzene.

The meta- and para-tertiarybutylethylbenzenes are separated from the meta- and para-tertiarybutylstyrenes by fractional distillation. The meta- and para-tertiarybutylstyrenes are separated in a separate fractional distillation.

The catalyst used in this example is prepared by mixing 51.2 parts by weight of pigment grade iron oxide ($Fe_2O_3$), 26.3 parts by weight of potassium carbonate ($K_2CO_3$), 2.5 parts by weight of chromic oxide ($Cr_2O_3$), and 20.0 parts by weight of Portland cement. All the solids are finely divided prior to mixing and enough water is added to provide an extrudable mass. This mass is extruded into ⅛ inch diameter extrusions. The extrusions are dried, broken into short lengths, and calcined in air at 750° C. for 12 hours. The Portland cement has the following analysis:

| | Percent by weight |
|---|---|
| CaO | 63.2 |
| $SiO_2$ | 21.3 |
| $Al_2O_3$ | 6.0 |
| $Fe_2O_3$ | 2.7 |
| MgO | 2.9 |
| $SO_3$ | 1.8 |

EXAMPLE 6

The dehydrogenation reaction of Example 5 is repeated except that the mixture of feed stock and steam is heated to 1130° F. The temperature at the top of the reactor is 1075° F., the temperature in the middle is 1080° F., and the temperature at the bottom of the reactor is 1080° F. The pressure at the top of the reactor is 26 p.s.i.g. The steam to feed stock ratio and the space velocity are the same as in Example 5. The feed stock contains 20.8% of meta-tertiarybutylethylbenzene and 76.5% of para-tertiarybutylethylbenzene.

The product contains 9.6% of meta-tertiarybutylstyrene and 35.1% of para-tertiarybutylstyrene. The product also contains 10.6% of meta-tertiarybutylethylbenzene and 35.1% of para-tertiarybutylethylbenzene.

EXAMPLE 7

The dehydrogenation run of Example 5 is repeated except that the mixture of steam and feed stock is heated to a temperature of 1145° F. The temperature at the top, middle, and bottom of the reactor is 1090° F. The pressure at the top of the reactor is 27 p.s.i.g. The steam to feed stock ratio and the space velocity are the same as in Example 5. The feed stock contains 21.1% of meta-tertiarybutylethylbenzene and 76.1% of para-tertiarybutylethylbenzene.

The product contains 9.6% of meta-tertiarybutylstyrene styrene, and 36.5% of para-tertiarybutylstyrene. The product also contains 7.3% of meta-tertiarybutylethylbenzene and 31.0% of para-tertiarybutylethylbenzene.

EXAMPLE 8

The process of Example 1 is repeated except that meta-tertiarybutylethylbenzene is used instead of the mixture of meta- and para-tertiarybutylethylbenzenes.

The meta-tertiarybutylstyrene, which is separated from unreacted meta-tertiarybutylethylbenzene by fractional distillation, has a boiling point of 75° C. at pressure of 5 mm. of mercury.

EXAMPLE 9

The process of Example 1 is repeated except that para-tertiarybutylethylbenzene is used instead of the mixture of meta- and para-tertiarybutylethylbenzenes.

The para-tertiarybutylstyrene, which is separated from unreacted meta-tertiarybutylethylbenzene by fractional distillation, has a boiling point of 97° C. at a pressure of 13 mm. of mercury.

Numerous modifications and variations of the present invention will be apparent to those skilled in the alkylation and dehydrogenation arts. Therefore, it is to be understood that this invention is not too limited in its application to the details specifically described or illustrated but may be practiced within the scope of the appended claims otherwise than as specifically described and illustrated.

What is claimed is:

1. A process for the preparation of a vinyl aromatic hydrocarbon of the class consisting of meta- and para-tertiarybutylstyrenes and mixtures thereof, which comprises passing a mixture with steam of an aromatic hydrocarbon of the class consisting of meta- and para-tertiarybutylethylbenzenes and mixtures thereof, in a ratio of from about 1.5 to 20 pounds of steam per pound of aromatic hydrocarbon and at a temperature of from about 1000° F., to about 1300° F., through a dehydrogenation catalyst in particulate form at a space velocity of from about 0.1 to about 1.0 pound of aromatic hydrocarbon per hour per pound of catalyst.

2. A process according to claim 1 in which the mixture of steam and aromatic hydrocarbon is in a ratio of from about 3 to 7 pounds of steam per pound of aromatic hydrocarbon, is at a temperature of from about 1100° F., to about 1200° F., and is passed through a dehydrogenation catalyst in particulate form at a space velocity of from about 0.3 to about 0.5 pound of aromatic hydrocarbon per hour per pound of catalyst.

3. A process according to claim 1 in which the vinyl aromatic hydrocarbon is meta-tertiarybutylstyrene and the aromatic hydrocarbon is meta-tertiarybutylethylbenzene.

4. A process according to claim 1 in which the vinyl aromatic hydrocarbon is para-tertiarybutylstyrene and the aromatic hydrocarbon is para-tertiarybutylethylbenzene.

5. A process according to claim 2 in which the vinyl aromatic hydrocarbon is meta-tertiarybutylstyrene and the aromatic hydrocarbon is meta-tertiarybutylethylbenzene.

6. A process according to claim 2 in which the vinyl aromatic hydrocarbon is para-tertiarybutylstyrene and the aromatic hydrocarbon is para-tertiarybutylethylbenzene.

7. A process according to claim 1 in which the dehydrogenation catalyst consists essentially of iron oxide, a minor amount of an alkali metal, a minor amount of chromium oxide, and from about 5% to 30% by weight of a hydraulic cement containing free calcium oxide.

8. A process according to claim 1 in which the dehydrogenation catalyst consists essentially of a major mol amount of iron oxide, a minor mol amount of an alkaline compound of potassium and a minor mol amount of at least one mol percent of chromium oxide, the mixture having been calcined at a temperature between about 800° C., and 950° C., in an atmosphere under which no appreciable formation of iron chromite takes place and for a sufficient period of time to decrease the available surface of the catalyst to below 30 square meters per gram.

9. A process according to claim 2 in which the dehydrogenation catalyst consists essentially of iron oxide, a minor amount of an alkali metal, a minor amount of chromium oxide, and from about 5% to 30% by weight of a hydraulic cement containing free calcium oxide.

10. A process according to claim 2 in which the dehydrogenation catalyst consists essentially of a major mol amount of iron oxide, a minor mol amount of an alkaline compound of potassium and a minor mol amount of at least one mol percent of chromium oxide, the mixture having been calcined at a temperature between about 800° C., and 950° C., in an atmosphere under which no appreciable formation of iron chromite takes place and for a sufficient period of time to decrease the available surface of the catalyst to below 30 square meters per gram.

References Cited

UNITED STATES PATENTS

| | | | |
|---|---|---|---|
| 2,390,835 | 12/1945 | Hennion et al. | 260—671 |
| 2,768,985 | 10/1956 | Schlatter | 260—671 |
| 3,209,049 | 9/1965 | Pitzer | 260—669 X |
| 3,306,942 | 2/1967 | Lee | 260—669 |
| 3,308,179 | 3/1967 | Scott | 260—669 |

CURTIS R. DAVIS, Primary Examiner

U.S. Cl. X.R.

260—671